United States Patent
Hayashide

(10) Patent No.: US 7,505,184 B2
(45) Date of Patent: Mar. 17, 2009

(54) ADJUSTING METHOD OF IMAGE READING APPARATUS AND IMAGE READING APPARATUS

(75) Inventor: Tadao Hayashide, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 989 days.

(21) Appl. No.: 10/929,494

(22) Filed: Aug. 31, 2004

(65) Prior Publication Data

US 2005/0063025 A1 Mar. 24, 2005

(30) Foreign Application Priority Data

Sep. 22, 2003 (JP) ............... 2003-330029

(51) Int. Cl.
*H04N 1/04* (2006.01)
(52) U.S. Cl. .................. 358/497; 358/475; 358/474
(58) Field of Classification Search ................ 358/497, 358/475, 474; 359/684
See application file for complete search history.

(56) References Cited

U.S. PATENT DOCUMENTS

| | | | | |
|---|---|---|---|---|
| 5,691,854 | A * | 11/1997 | Yoshida et al. ............ | 359/823 |
| 6,493,061 | B1 | 12/2002 | Arita et al. ............... | 355/41 |
| 6,507,444 | B2 | 1/2003 | Hayashide et al. ......... | 359/729 |
| 7,062,106 | B2 * | 6/2006 | Hayashide ................ | 382/275 |
| 2002/0159165 | A1 * | 10/2002 | Ford ....................... | 359/722 |
| 2003/0038228 | A1 | 2/2003 | Fujibayashi et al. ....... | 250/208.1 |
| 2003/0132384 | A1 | 7/2003 | Sugiyama et al. .......... | 250/330 |
| 2004/0008421 | A1 * | 1/2004 | Yoshida et al. ............ | 359/684 |

FOREIGN PATENT DOCUMENTS

| | | |
|---|---|---|
| CN | 2514363 | 10/2002 |
| JP | 2000-171705 | 6/2000 |
| JP | 2000-324303 | 11/2000 |
| JP | 2001-127960 | 5/2001 |
| JP | 2001-189833 | 7/2001 |
| JP | 2002-335375 | 11/2002 |

* cited by examiner

*Primary Examiner*—Houshang Safaipour
(74) *Attorney, Agent, or Firm*—Fitzpatrick, Cella, Harper & Scinto

(57) ABSTRACT

An image reading apparatus in which an original is illuminated with visible light and with infrared light, and in which a lens assembly forms an image of the original on the surface of a reading device such as a CCD. The lens assembly is housed in a lens barrel. A focus correcting device such as a flat glass or resin plate is movably mounted to the lens barrel, so as to correct defocus of the original on the surface of the reading device due to differences in wavelength between the visible light and the infrared light. The lens assembly includes a resin lens which is disposed on a side of the lens assembly nearest to the reading device, and which is mounted in close proximity to the focus correcting device.

5 Claims, 9 Drawing Sheets

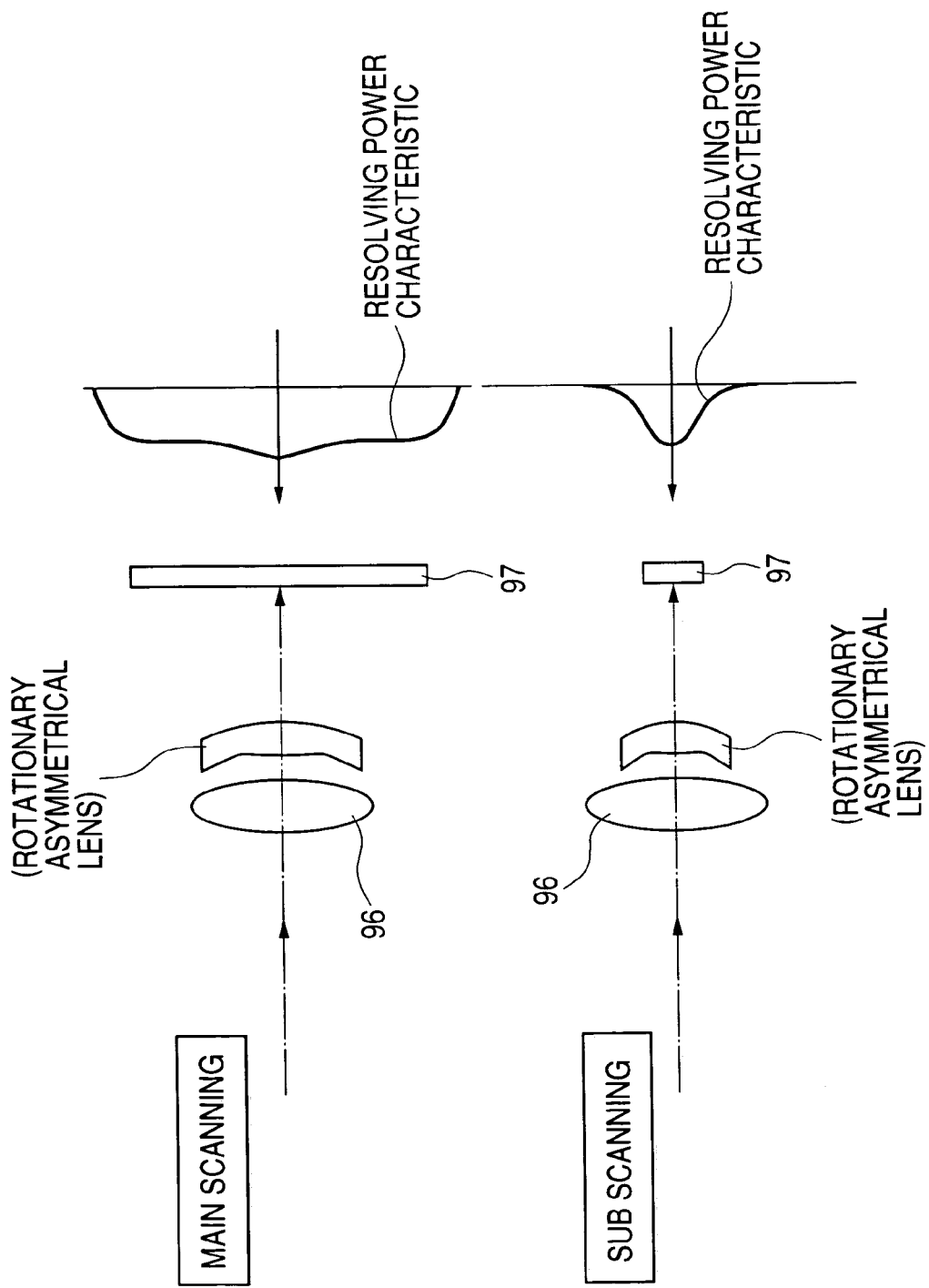

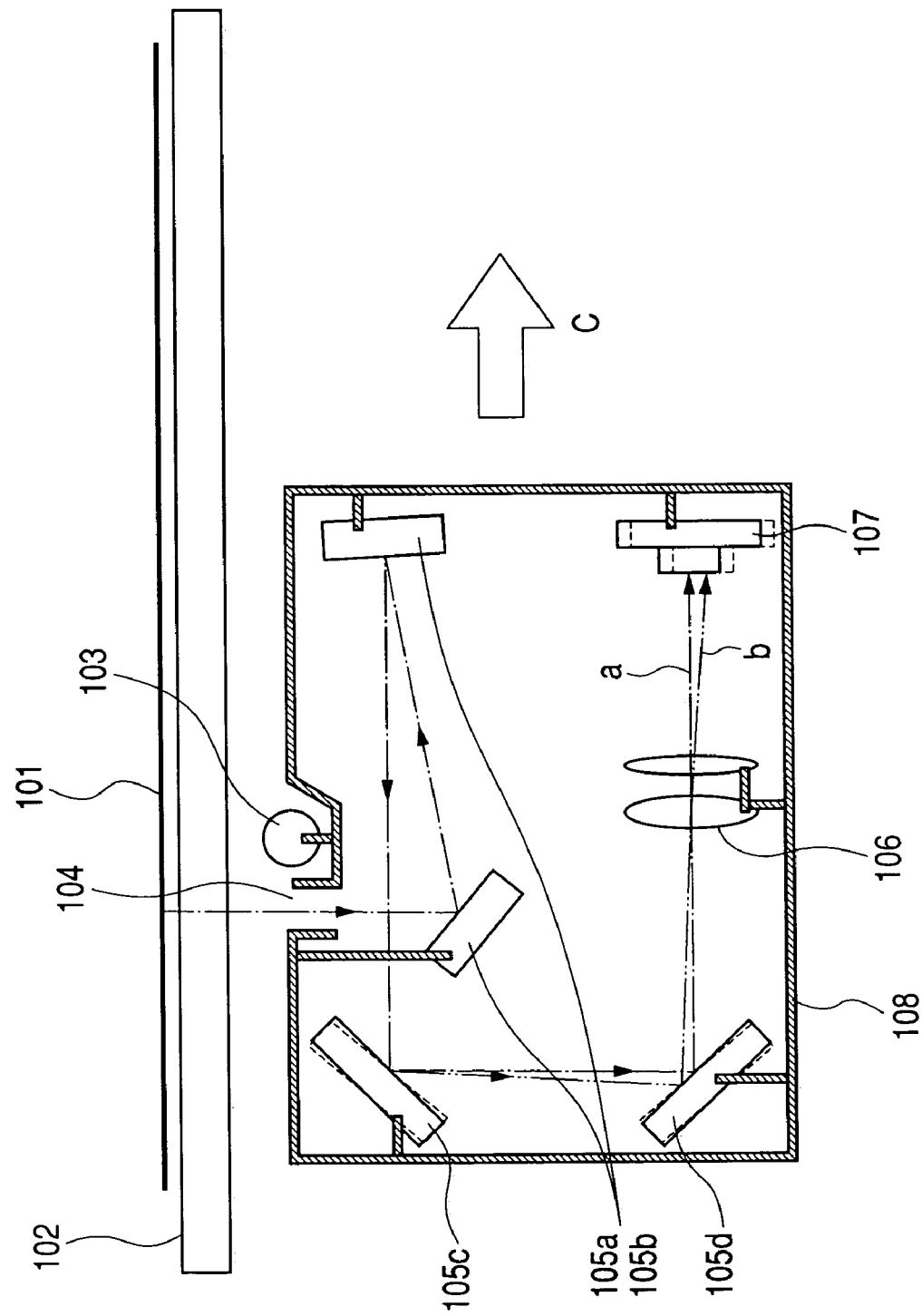

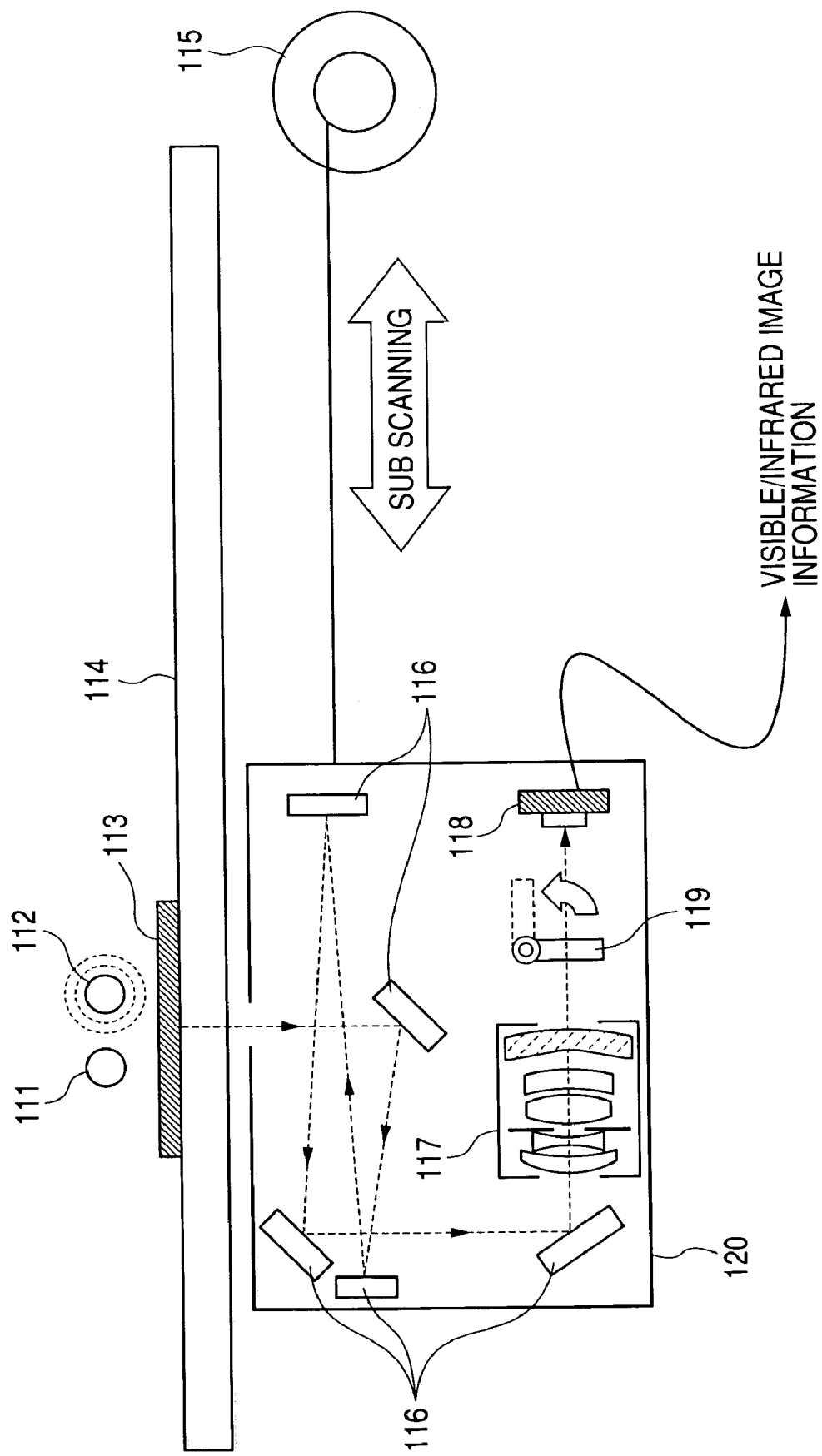

ADJUSTING METHOD OF IMAGE READING APPARATUS AND IMAGE READING APPARATUS

BACKGROUND OF THE INVENTION

1. Field of the Invention

The present invention relates to an adjusting method of image reading apparatus and an image reading apparatus, in particular, those suitable for use in and as an image reading apparatus, such as an image scanner, a copying machine, and a facsimile apparatus, in which image information of an original is imaged on the surface of a reading means (CCD), making it possible to perform image reading with high accuracy.

2. Related Background Art

FIG. 8 is a schematic view of a main portion of a conventional carriage-integrated type image reading apparatus (flat head scanner).

In the drawing, reference numeral 82 indicates an original table glass, on which an original 81 is placed. Reference numeral 88 indicates a carriage, which retains an illumination light source 83 described below, a plurality of reflecting mirrors 85a, 85b, 85c, and 85d, an imaging lens 86, a reading means 87, etc., and performs scanning in the sub scanning direction in the drawing by means of a sub scanning mechanism 89, such as a motor, thereby two-dimensionally reading the image information of the original 81. The image information is sent to a personal computer or the like, which is an external apparatus, through an interface (not shown).

The illumination light source 83 consists of a xenon tube, a halogen lamp, an LED array, or the like. Inside the carriage 88, the reflecting mirrors 85a, 85b, 85c, and 85d bend light beam from the original 81. The imaging lens 86 forms an image of the light from the original 81 on the surface of the reading means 87. The reading means 87 consists of a linear sensor, such as a CCD (charge coupled device), and is composed of a plurality of light receiving elements arranged in the main scanning direction, which is perpendicular to the plane of the drawing.

In the above configuration, to attain a reduction in the size of the carriage-integrated type image reading apparatus (flat bed scanner), it is necessary to reduce the size of the carriage 88. A reduction in the size of the carriage 88 can be achieved by, for example, increasing the number of reflecting mirrors or securing the requisite optical path by effecting reflection a plurality of number of times with a single reflecting mirror.

However, in these methods, the interior construction of the carriage 88 becomes rather complicated, which involves an exact requirement in terms of assembly accuracy and a substantial increase in cost. Further, in proportion to the surface precision of the reflecting mirrors and the number of times that reflection is effected, the imaging performance deteriorates, which also affects the read image.

In view of this, the present applicant has previously proposed, in U.S. Pat. No. 6,507,444 (Japanese Patent Application Laid-Open No. 2000-171705), an image reading apparatus in which there is introduced into the imaging lens an anamorphic lens at least one surface of which is rotationally asymmetric with respect to the optical axis, thereby making the view angle of the imaging lens 88 wider and reducing the subject-to-image distance to shorten the optical path length itself.

Further, an image reading apparatus is known which uses an off-axial reflection surface of a rotationally asymmetrical configuration as a means for solving the problems accompanying widening of view angles, such as generation of chromatic aberration (see, for example, USAA 2003038228 (Japanese Patent Application Laid-Open No. 2002-335375)).

Further, there has conventionally been known an image reading apparatus which obtains information on dirt and flaws on an original surface by using infrared light and performs correction on the corresponding portion in visible image information (see, for example, USAA 2003132384 (Japanese Patent Application Laid-Open No. 2000-324303) and U.S. Pat. No. 6,493,061 (Japanese Patent Application Laid-Open No. 2001-189833)).

FIG. 11 is a schematic diagram showing a main portion of a carriage-integrated type image reading apparatus (flat bed scanner) as proposed in USAA 2003132384 (Japanese Patent Application Laid-Open No. 2000-324303) and U.S. Pat. No. 6,493,061 (Japanese Patent Application Laid-Open No. 2001-189833).

The image reading apparatus as shown in the drawing has as light source means an infrared light source 111 and a visible light source 112. In the drawing, image information on a film 113 constituting the transmissive original to be illuminated by one of the light sources for reading, is transmitted by way of a plurality of turn-back mirrors 116 and an imaging lens 117 to effect imaging on the surface of a CCD (line CCD) 118 in which a plurality of pixels are arranged in the main scanning direction.

The imaging lens 117 has a configuration in which a plurality of glass or resin lenses are contained in a lens barrel. The film 113 is placed on an original table glass 114. A focusing correction element 119 to be described later is disposed between the imaging lens 117 and the CCD 118. A carriage 120 is moved in the sub scanning direction by a driving device 115, and two-dimensional image information of the film 113 is read by the CCD 118.

In this type of image reading apparatus, the imaging position on the surface of the CCD 118 varies due to a difference in wavelength between the infrared light emitted from the infrared light source 111 and the visible light emitted from the visible light source 112, so that the focusing position is adjusted by making the focusing correction element 119 detachable (retractable) with respect to the optical path. Here, the focusing correction element 119 consists of a plane-parallel glass. Due to this configuration, it is possible to read the image information of both infrared and visible images in a satisfactory imaging condition.

The optical system shown in the above U.S. Pat. No. 6,507,444 (Japanese Patent Application Laid-Open No. 2000-171705) and USAA 2003038228 (Japanese Patent Application Laid-Open No. 2002-335375) has an optical element with a refraction surface or reflection surface that is rotationally asymmetrical, so that the imaging area on the CCD surface is also a rotationally asymmetrical area. In particular, as shown in FIG. 9, in an optical system attaining wider view angles, high priority is given to the imaging performance of the main scanning area, which is large, so that the area of high resolving power is large in the main scanning area, whereas it is small in the sub scanning area.

Further, in a carriage-integrated type image reading apparatus, it is rather difficult to maintain high positional accuracy for the parts due, for example, to the large number of components, the great variation in molding accuracy of the carriage in resin molding, which is adopted in view of material cost, etc.

All in all, in a carriage-integrated type image reading apparatus, introduction of an imaging lens (imaging means) with a small imaging area in the sub scanning direction leads to the following problem.

For example, in the carriage-integrated type image reading apparatus shown in FIG. 10, when the parts are accurately positioned, the reading optical path takes the route as indicated by the alternate long and short dashed line a, and reaches (effects imaging on) the surface of the CCD 107. However, when, for example, the reflecting mirror 105c is positionally deviated, the reading optical path takes the route as indicated by the chain double-dashed line b from the reflecting mirror surface before reaching a position in the vicinity of the CCD 107.

In view of this, in the conventional image reading apparatus, in order to obtain satisfactory image information, the CCD 107 is shifted for adjustment in the sub scanning direction when receiving image information from the original.

However, in an image reading apparatus having an imaging lens with a rotationally asymmetrical refraction or reflection surface, the imaging area in the sub scanning direction is determined according to the position of the imaging lens 106, so that performing shift adjustment as mentioned above results in the CCD 107 being deviated from the imaging area in the sub scanning direction, making it impossible to obtain satisfactory image information.

In the carriage-integrated type image reading apparatus shown in FIG. 11, it is possible to read both visible image information and infrared image information in a satisfactory imaging condition. However, the apparatus involves the following problems.

(Problem 1: Size of the Focusing Correcting Means)

Light beam with image information increases in width in the main scanning direction as it is departed from the imaging lens 117. Thus, in the conventional image reading apparatus, in which the focusing correction element 119 is disposed at a position spaced apart from the imaging lens 117, it is rather difficult to attain a reduction in the size of the focusing correction element 119. When the focusing correction element 119 is large, it is necessary for the driving device, such as a motor or an electromagnet, for moving the focusing correction element 119 to be relatively powerful and large.

(Problem 2: Problem in Assembly Process)

For example, in an image reading apparatus using an ultra-wide angle lens as disclosed in U.S. Pat. No. 6,507,444 (Japanese Patent Application Laid-Open No. 2000-171705), the optical path length is small, so that the distance between the imaging lens 117 and the CCD 118 is small, and it is rather difficult to incorporate the focusing correction element 119, with the result that the assembly process is complicated, resulting in a deterioration in process yield and an increase in assembly time.

(Problem 3: Dirt and Flaws on the Imaging Lens)

In addition to Problem 2, when incorporating the focusing correction element 119 into the small space, the imaging lens 117, the CCD 118, etc. may be inadvertently touched, resulting in dirt such as a finger mark, flaws, etc. being imparted thereto. In particular, with a lens formed by using a cycloolefin polymer type resin or the like, it is impossible to wash away any dirt thereon.

SUMMARY OF THE INVENTION

It is a first object of the present invention to provide an adjusting method of image reading apparatus and an image reading apparatus wherein apparatus adjustment is conducted by using an adjustment chart allowing resolving power evaluation in the sub scanning direction, thereby making it possible to obtain high quality image information.

It is a second object of the present invention to provide an image reading apparatus wherein a reduction in focusing correcting means is effected, wherein the image reading apparatus assembly process is simplified, and wherein there is provided a function to protect the lens surface, thereby making it possible to obtain high quality image information.

According to one aspect of the invention, there is provided an adjusting method of image reading apparatus in which image information of an original is read by moving a carriage in a sub scanning direction relative to the original, the carriage comprising: a light source means for illuminating the original placed on an original table, a slit portion for regulating light from the original, a plurality of mirrors for reflecting the light regulated by the slit portion; an imaging means for effecting imaging with the light reflected by the plurality of mirrors, the imaging means including an optical element with an optical surface rotationally asymmetrical with respect to an optical axis; and a reading means arranged at an imaging position of the imaging means and extending in a line-like fashion in a main scanning direction. The adjusting method of image reading apparatus includes placing an adjustment chart on the original table, the adjustment chart allowing resolving power evaluation in the sub scanning direction; illuminating the adjustment chart by the light source means; and adjusting, by using an image of the adjustment chart thus illuminated, a relative positional relationship in the sub scanning direction among the slit portion, the imaging means, and the reading means by a positioning adjustment means such that imaging of the light passing through a slit center of the slit portion is effected on a surface of the reading means.

In further aspect of the invention, the positioning adjustment means adjusts at last one of: an angle in the sub scanning direction of at last one of the plurality of mirrors; a position in the sub canning direction of the imaging means; and a position in the sub scanning direction of the reading means.

In further aspect of the invention, the positioning adjustment means adjusts at last one of: a position in the sub scanning direction of the slit portion; a position in the sub canning direction of the imaging means; and a position in the sub scanning direction of the reading means.

According to another aspect of the invention, there is provided an adjusting method of image reading apparatus in which image information of an original is read by moving a third carriage in a sub scanning direction relative to the original, the third carriage being equipped with a first carriage and a second carriage, the first carriage retaining a light source means for illuminating the original placed on an original table, a slit portion for regulating light from the original, and a plurality of mirrors for reflecting the light regulated by the slit portion, the second carriage retaining an imaging means for effecting imaging with the light reflected by the plurality of mirrors, the imaging means including an optical element with an optical surface rotationally asymmetrical with respect to an optical axis, and a reading means arranged at an imaging position of the imaging means and extending in a line-like fashion in a main scanning direction, wherein the imaging means is endowed with a resolving power characteristic in which, on the reading means, a resolving power in the sub scanning direction is lower than a resolving power in the main scanning direction, and wherein a relative positional relationship in the sub scanning direction between the first carriage and the second carriage is adjusted by a positioning adjustment means.

In further aspect of the invention, the positioning adjustment means is capable of performing adjustment also in a direction of the optical axis.

In further aspect of the invention, the adjusting method of image reading apparatus further includes: arranging the second carriage on an adjustment jig without an intermediation of the first carriage; fixing an adjustment chart at a predetermined position, the adjustment chart allowing resolving power evaluation in the sub scanning direction being fixed; illuminating the adjustment chart by the light source means; reading an image of the adjustment chart thus illuminated by the reading means; and adjusting a relative positional relationship in the sub scanning direction between the imaging means and the reading means by using the image read by the reading means.

According to another aspect of the invention, an image reading apparatus includes: an illuminating means having a visible light source means for effecting light emission in a visible range and an infrared light source means for effecting light emission in an infrared range; an imaging means for effecting imaging on a surface of a reading means by using an original illuminated by light from the illuminating means, and a focusing correcting means for correcting defocusing of the original on the surface of the reading means due to a difference in wavelength between emission lights from the visible light source means and the infrared light source means, wherein the focusing correcting means is movably mounted to a lens barrel accommodating the imaging means.

In further aspect of the invention, the focusing correcting means is formed of a flat glass plate.

In further aspect of the invention, the focusing correcting means is formed of a flat transmissive resin plate.

In further aspect of the invention, the imaging means has a resin lens arranged on a side thereof nearest to one of the original and the reading means.

In further aspect of the invention, the resin lens is arranged close to the focusing correcting means.

In further aspect of the invention, the focusing correcting means is retracted from an optical path when imaging is to be effected on the reading means by using image information in the infrared range.

According to a first aspect of the present invention, there is used an adjustment chart allowing resolving power evaluation in the sub scanning direction, and the relative positional relationship in the sub scanning direction among a slit portion, an imaging means, and a reading means is adjusted such that light based on an image in the adjustment chart passes the center of the slit and that imaging is effected on the surface of the reading means, thereby making it possible to realize an adjusting method of image reading apparatus and an image reading apparatus which can provide high quality image information.

According to a second aspect of the present invention, a focusing correcting means is movably mounted in a lens barrel containing the imaging means, whereby it is possible to realize an image reading apparatus which can provide high quality image information and in which it is possible to achieve a reduction in the size of the focusing correcting means, simplify the image reading apparatus assembly process, and protect the lens surface.

BRIEF DESCRIPTION OF THE DRAWINGS

FIG. 9 is a diagram showing the imaging characteristics of a lens having a rotationally asymmetrical refraction surface;

FIG. 10 is a schematic view of a main portion of a conventional image reading apparatus; and FIG. 11 is a schematic view of a main portion of a conventional image reading apparatus.

DESCRIPTION OF THE PREFERRED EMBODIMENTS

In the present invention, the term resolving power refers to an index of the performance of a lens or an optical system making it possible to reproduce images of such objects as two dots or parallel lines very close to each other as distinctly separate images. When a lens or an optical system is considered as an image information transmission system, its resolving power is an amount indicating the degree of image fineness to which it is capable of transmitting image information. Usually, a rectangular wave pattern or a sinusoidal wave pattern is adopted; with a combination of a black and a white line regarded as one line, the resolving power is expressed as the number of lines/mm.

In the present invention, there is used an optical element with a rotationally asymmetrical refraction surface or reflection surface, so that the imaging area on the surface of a CCD is also a rotationally asymmetrical area. Also in the image reading apparatus of the present invention a wider-view-angle optical system construction is adopted, so that, as shown in FIG. 9, high priority is given to the imaging performance of the wide, main scanning area; thus, in the present invention, there is adopted an optical system in which the range of high resolving power characteristic is large in the main scanning area, and small in the sub scanning area.

That is, the imaging means of the present invention is equipped with a resolving power characteristic in which, on the reading means, the resolving power in the sub scanning direction is lower than the resolving power in the main scanning direction.

In the following, embodiments of the present invention will be described with reference to the drawings.

Embodiment 1

Figure 1A:
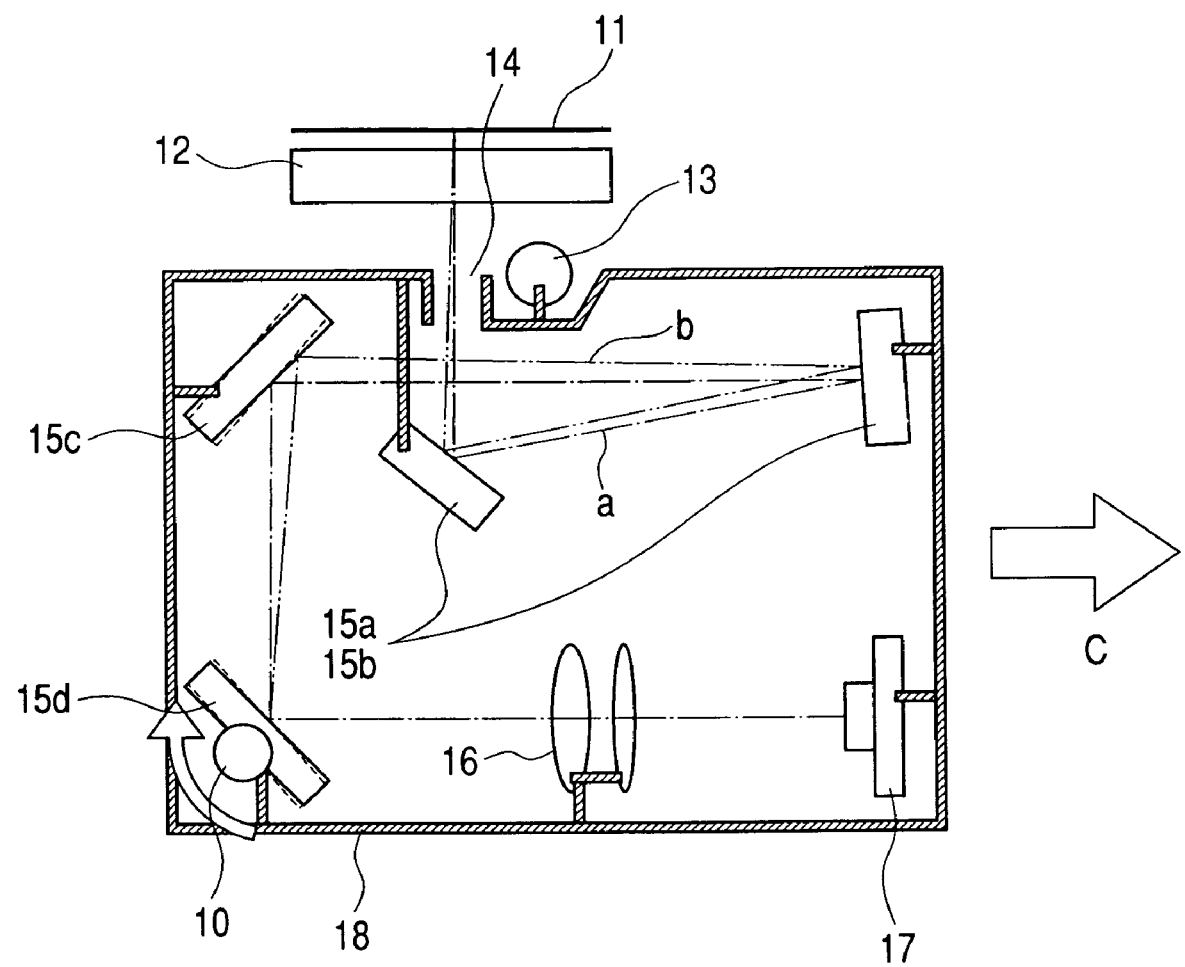
FIG. 1A is a schematic view of a main portion of Embodiment 1 of the present invention.
Figure 1B:
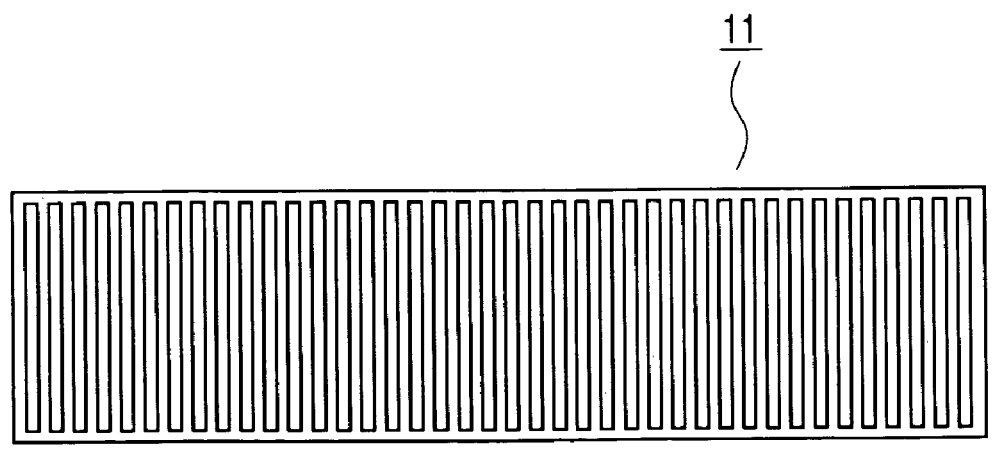
FIG. 1B is an enlarged explanatory view of an adjustment chart according to Embodiment 1 of the present invention.

FIG. 1A is a main portion schematic view of Embodiment 1, illustrating an adjusting method of image reading apparatus according to the present invention; and FIG. 1B is an enlarged explanatory view of an adjustment chart shown in FIG. 1A.

In the drawings, reference numeral 12 indicates an original table glass, on the surface of which an adjustment chart (multi-line chart) 11 is placed. As shown in FIG. 1B, the adjustment chart has a multi-line portion capable of resolving power evaluation in the sub scanning direction, with the multi-line portion extending in the sub scanning direction.

Reference numeral 18 indicates a carriage, which retains an illumination light source 13 as a light source means, a slit portion 14, a plurality of reflecting mirrors 15a, 15b, 15c, and 15d, an imaging lens 16 as an imaging means, a photoelectric transducer (CCD) 17 as a reading means, etc., and is adapted to perform scanning in the sub scanning direction by means of a driving device (not shown), such as a sub scanning motor, in the sub scanning direction (in the direction of the arrow C in FIG. 1A) to thereby read image information from the original.

The focal depth in the sub scanning direction of the imaging lens 16 used in this embodiment is within the range of not less than 0.5 mm and not more than 4 mm. When the focal depth in the sub scanning direction is not more than 4 mm, the problem to be solved by the present invention becomes more conspicuous.

When the focal depth in the sub scanning direction of the imaging lens 16 is not more than 4.0 mm, it is highly possible that the final fixing position of the CCD will not be covered by the focal depth with the conventional adjusting and assembling method in view of the general configurations of and retention accuracy for the carriage, the mirrors, the lens, and the CCD.

When the focal depth in the sub scanning direction of the imaging lens 16 is not more than 0.5 mm, the entirety of the effective light receiving element portion of the CCD may not be within the focal depth no matter what adjustment may be performed, which means such a focal depth cannot be adopted.

The illumination light source 13 consists, for example, of a fluorescent lamp or a halogen lamp. The slit portion 14 regulates light beam (light beam width) from the adjustment chart 11. The first, second, third, and fourth reflecting mirrors 15a, 15b, 15c, and 15d bend inside the carriage 18 the optical path of the light beam from the adjustment chart 11. The imaging lens 16 includes an optical element with a refraction surface rotationally asymmetrical with respect to the optical axis, and effects imaging on the surface of the reading means 17 with the light based on the image of the adjustment chart 11. The reading means 17 is disposed at the imaging position of the imaging lens 16, and consists of a photoelectric transducer (CCD), which consists of a plurality of light receiving elements arranged in the main scanning direction, which is perpendicular to the plane of the drawing.

In this embodiment, there is used, as the optical element with a rotationally asymmetrical refraction surface, an anamorphic lens in which both the radius of curvature in the main scanning direction and the radius of curvature in the sub scanning direction are endowed with power, and in which the radius of curvature in the main scanning direction and the radius of curvature in the sub scanning direction are different from each other.

Reference numeral 10 indicates a mirror adjustment device serving as a positioning adjustment means, which is mounted to the fourth reflecting mirror 15d, adjusting the angle in the sub scanning direction of the fourth reflecting mirror 15d. In this embodiment, by adjusting the angle in the sub scanning direction of the fourth reflecting mirror 15d, the relative positional relationship in the sub scanning direction among the slit portion 14, the imaging lens 16, and the CCD 17 is adjusted.

Next, the adjusting method of image reading apparatus of this embodiment will be described.

Figure 1C:
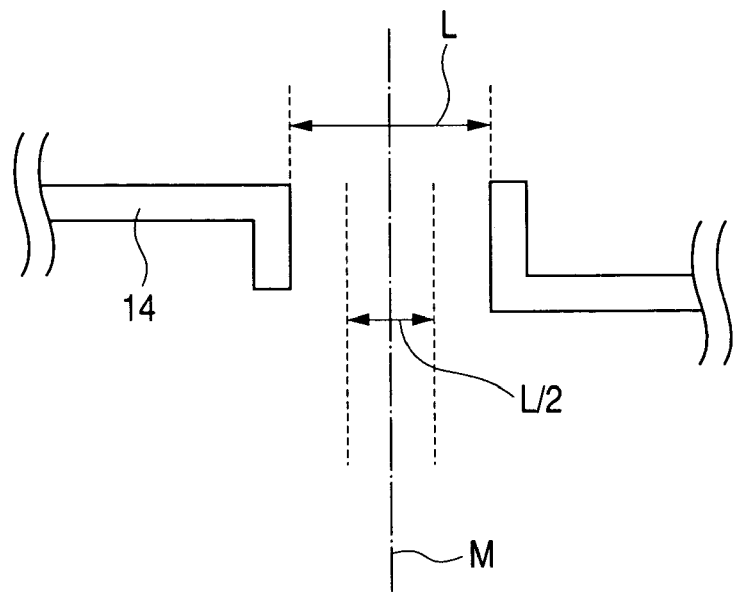
FIG. 1C is an enlarged explanatory view of a portion around a slit according to Embodiment 1 of the present invention.

FIG. 1C is an enlarged explanatory view of the slit portion and its periphery shown in FIG. 1A. In the drawing, symbol L indicates the opening width in the sub scanning direction of the slit portion 14, and symbol M indicates the centerline thereof. Here, the region including the centerline M and having a width L/2 is defined as the slit center.

First, light beam based on the image of the adjustment chart 11 illuminated by light beam emitted from the illumination light source 13 passes the slit center, and travels by way of the first, second, third, and fourth reflecting mirrors 15a, 15b, 15c, and 15d before effecting imaging on the surface of the CCD 17 by means of the imaging lens 16.

When the reflecting mirrors 15a, 15b, 15c, and 15d are mounted at predetermined positions, the light beam takes the reading optical path as indicated by the alternate long and short dashed line a in FIG. 1A, whereas, when, for example, the mounting position of the third reflecting mirror 15c is deviated as indicated by the dashed line, the reading optical path does not reach the surface of the CCD 17 as stated above, resulting in a deterioration in resolving power.

In view of this, in this embodiment, the angle in the sub scanning direction of the fourth reflecting mirror 15d is adjusted by the mirror adjustment device 10, whereby the reading optical path takes the route as indicated by the chain double-dashed line b in FIG. 1A, and the light beam based on the image of the adjustment chart 11 having passed the slit center travels along the optical axis of the imaging lens 16 to effect imaging on the surface of the CCD 17, thereby making it possible to obtain a satisfactory image.

When performing the adjustment, a signal output from the CCD 17 is displayed on the screen of an adjusting tool (not shown) (which is an oscilloscope or the like), and, based on the display result, the angle in the sub scanning direction of the fourth reflecting mirror 15d is adjusted by the mirror adjustment device 10 so that the resolving power performance may become satisfactory.

In this way, as described above, in this embodiment, light beam based on the image of the adjustment chart passes the slit center, and the relative positional relationship in the sub scanning direction among the slit portion 14, the imaging lens 16, and the CCD 17 is adjusted by the above method so that imaging may be effected on the surface of the CCD 17 without involving deviation, whereby it is possible to obtain a satisfactory image.

In this embodiment, the reflecting mirrors are relatively small components, so that it is also possible for the mirror adjustment device to be reduced in size, thereby contributing to a reduction in the size of the entire apparatus.

While in this embodiment the angle in the sub scanning direction of the fourth reflecting mirror 15d is adjusted, this should not be construed restrictively; it is also possible to adjust the angle in the sub scanning direction of some other reflecting mirror or the angles in the sub scanning direction of a plurality of reflecting mirrors. Further, while in this embodiment solely the angle of the fourth reflecting mirror 15d is adjusted by the positioning adjustment means, this should not be construed restrictively; it is also possible to relatively adjust the position in the sub scanning direction of the imaging lens 16 or the position in the sub scanning direction of the CCD 17.

Embodiment 2

Figure 2:
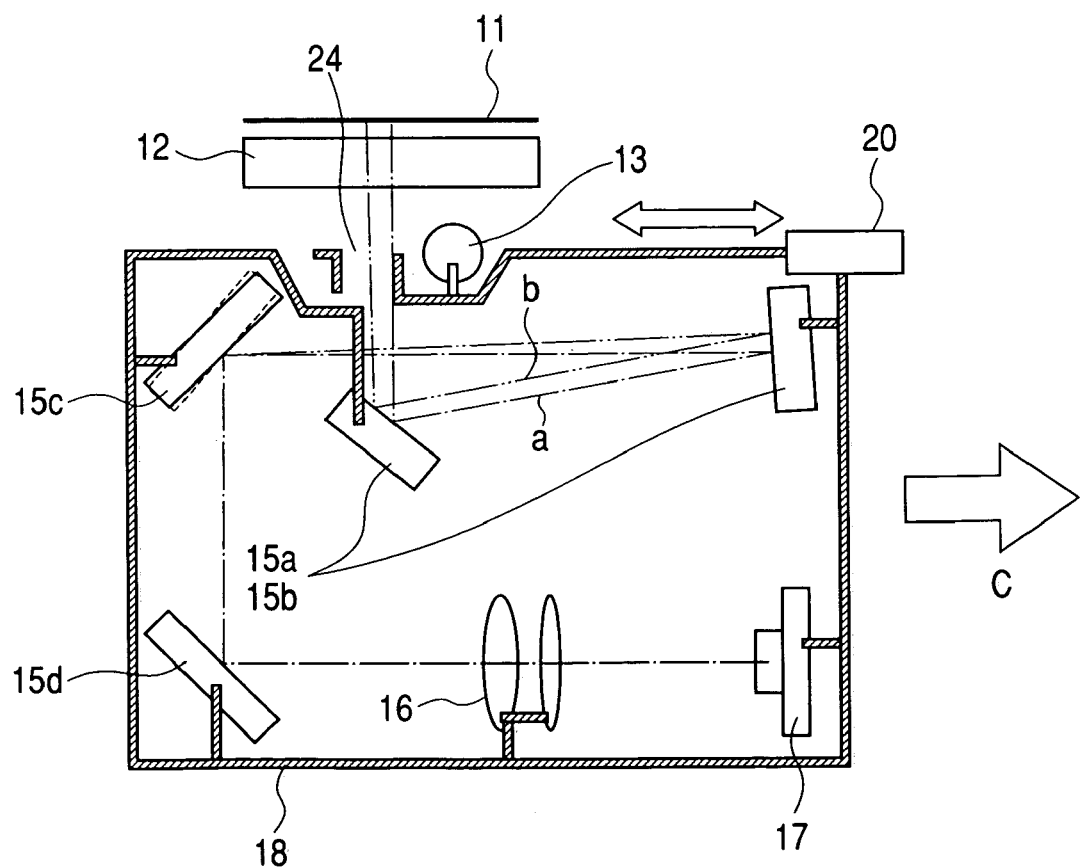
FIG. 2 is a schematic view of a main portion of Embodiment 2 of the present invention.

FIG. 2 is a main portion schematic view illustrating an adjusting method of image reading apparatus according to Embodiment 2 of the present invention. In the drawing, the components that are the same as those shown in FIG. 1A are indicated by the same reference numerals.

This embodiment differs from Embodiment 1 described above in that the relative positional relationship in the sub scanning direction among the slit portion 24, the imaging lens 16, and the CCD 17 is adjusted by adjusting the position in the sub scanning direction of the slit portion 24. Otherwise, this embodiment is the same as Embodiment 1 in configuration and optical operation, and provides the same effect.

In the drawing, reference numeral 20 indicates a slit position adjustment device serving as the positioning adjustment means, which is mounted to the slit portion 24, for adjusting the position in the sub scanning direction of the slit portion 24.

Next, the adjusting method of image reading apparatus of this embodiment will be described.

First, as in Embodiment 1 described above, light beam based on the image of the adjustment chart 11 illuminated with light beam emitted from the illumination light source 13 passes the slit center, and travels by way of the first, second, third, and fourth reflecting mirrors 15a, 15b, 15c, and 15d to effect imaging on the surface of the CCD 17 by means of the imaging lens 16.

When the reflecting mirrors 15a, 15b, 15c, and 15d are mounted at predetermined positions, the light beam takes the reading optical path as indicated by the alternate long and short dashed line a, whereas, when, for example, the mounting position of the third reflecting mirror 15c is deviated as indicated by the dashed line, the reading optical path does not reach the surface of the CCD 17 as stated above, resulting in a deterioration in resolving power.

In view of this, in this embodiment, the position in the sub scanning direction of the slit portion 24 is adjusted by the slit position adjustment device 20, whereby the reading optical path takes the route as indicated by the chain double-dashed line b of FIG. 2, and the light based on the image of the adjustment chart 11 having passed the slit center travels along the optical axis of the imaging lens 16 to effect imaging on the surface of the CCD 17, thereby making it possible to obtain a satisfactory image.

When performing the adjustment, a signal output from the CCD 17 is displayed on the screen of an adjusting tool (not shown) (which is an oscilloscope or the like), and, based on the display result, the position in the sub scanning direction of the slit portion 24 is adjusted by the slit position adjustment device 20 so that the resolving power performance may become satisfactory.

In this way, as described above, in this embodiment, light beam based on the image of the adjustment chart passes the slit center, and the relative positional relationship in the sub scanning direction among the slit portion 24, the imaging lens 16, and the CCD 17 is adjusted by the above method so that imaging may be effected on the surface of the CCD 17 without involving deviation, whereby it is possible to obtain a satisfactory image.

In this embodiment, the position of the slit portion 24 is relatively insignificant, so that the adjustment device may be of a simple configuration, thereby contributing to a reduction in the cost of the apparatus as a whole.

While in this embodiment solely the position in the sub scanning direction of the fourth slit portion 24 is adjusted by the positioning adjustment means, this should not be construed restrictively; it is also possible to relatively adjust the position in the sub scanning direction of the imaging lens 16 or the position in the sub scanning direction of the CCD 17.

Embodiment 3

Figure 3:
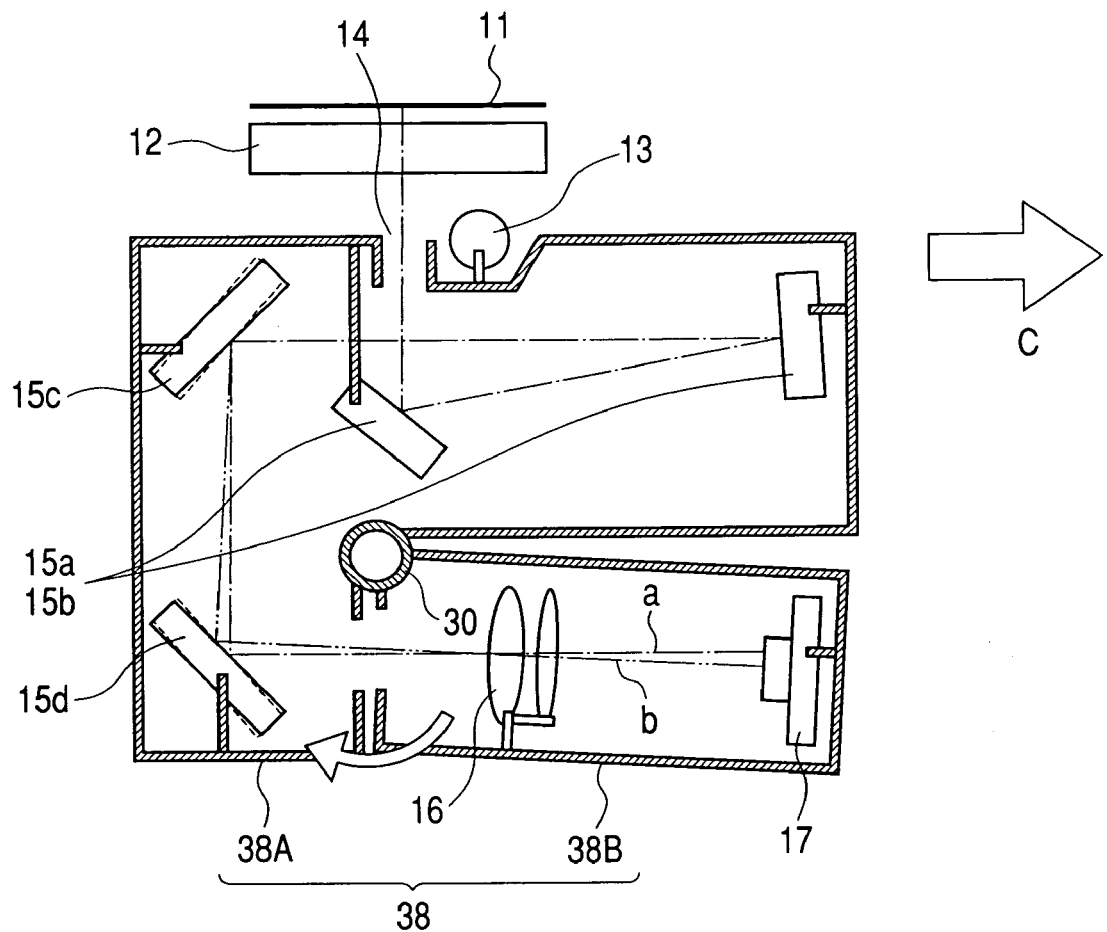
FIG. 3 is a schematic view of a main portion of Embodiment 3 of the present invention.

FIG. 3 is a main portion schematic view illustrating an adjusting method of image reading apparatus according to Embodiment 3 of the present invention. In the drawing, the components that are the same as those shown in FIG. 1A are indicated by the same reference numerals.

This embodiment differs from Embodiment 1 described above in that a carriage 38 is composed of a base carriage 38A and a slave carriage 38B, and, by adjusting the relative positional relationship between the two carriages 38A and 38B, the relative positional relationship in the sub scanning direction among the slit portion 14, the imaging lens 16, and the CCD 17 is adjusted. Otherwise, this embodiment is the same as Embodiment 1 in construction and optical operation, and provides the same effect.

In the drawing, reference numeral 38 indicates the carriage, which includes the base carriage 38a retaining the illumination light source 13, the slit portion 14, and the four reflecting mirrors 15a, 15b, 15c, and 15d, and the slave carriage 38B retaining the imaging lens 16 and the CCD 17.

Reference numeral 30 indicates a slave carriage position adjustment device serving as the positioning adjustment means, which is mounted to the joint portion of the base carriage 38A and the slave carriage 38B, for adjusting the relative positional relationship in the sub scanning direction between the base carriage 38A and the slave carriage 38B.

Next, the adjusting method of image reading apparatus of this embodiment will be described.

First, as in Embodiment 1 described above, light beam based on the image of the adjustment chart 11 illuminated with light beam emitted from the illumination light source 13 passes the slit center, and travels by way of the first, second, third, and fourth reflecting mirrors 15a, 15b, 15c, and 15d to effect imaging on the surface of the CCD 17 by means of the imaging lens 16.

When the reflecting mirrors 15a, 15b, 15c, and 15d are mounted at predetermined positions, the light beam takes the reading optical path as indicated by the alternate long and short dashed line a in FIG. 3, whereas, when, for example, the mounting position of the third reflecting mirror 15c is deviated as indicated by the dashed line, the reading optical path does not reach the surface of the CCD 17 as stated above, resulting in a deterioration in resolving power.

In view of this, in this embodiment, the relative positional relationship in the sub scanning direction between the base carriage 38A and the slave carriage 38B is adjusted by the slave carriage position adjustment device 30, whereby the reading optical path takes the route as indicated by the chain double-dashed line b in the drawing, and the light beam based on the image of the adjustment chart 11 having passed the slit center travels along the optical-axis of the imaging lens 16 to effect imaging on the surface of the CCD 17, thereby making it possible to obtain a satisfactory image.

When performing the adjustment, a signal output from the CCD 17 is displayed on the screen of an adjusting tool (not shown) (which is an oscilloscope or the like), and, based on the display result, the relative positional relationship in the sub scanning direction between the base carriage 38A and the slave carriage 38B is adjusted by the slave carriage position adjustment device 30 so that the resolving power performance may become satisfactory.

(Another Adjusting Method)

Figure 4:
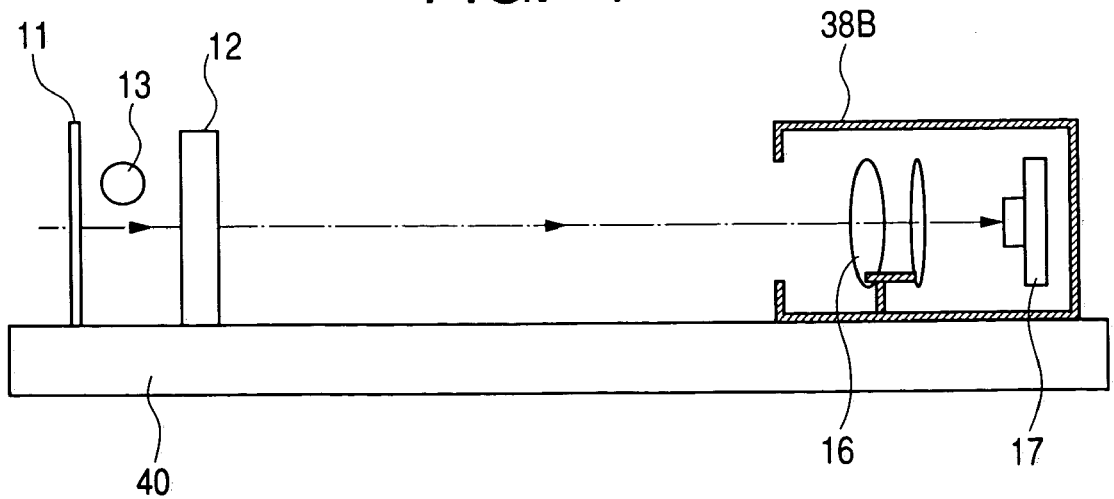
FIG. 4 is a schematic view of a main portion of a modification of Embodiment 3 of the present invention.

Further, in performing the adjustment according to Embodiment 3 described above, it is also possible to mount the slave carriage 38B on an adjustment jig 40 as shown in FIG. 4 and previously adjust the relative positional relationship in the sub scanning direction of the imaging lens 16 and the CCD 17. The adjustment jig 40 has no reflecting mirror, and maintains with high accuracy the relative positional relationship between the adjustment chart 11 and the slave carriage 38B.

That is, the adjustment chart 11 is illuminated by the illumination light source 13, the relative positional relationship in the sub scanning direction between the imaging lens 16 and the CCD 17 is adjusted such that light beam based on the image of the illuminated adjustment chart 11 effects imaging on the surface of the CCD 17.

When performing the adjustment, a signal output from the CCD 17 is displayed on the screen of an adjusting tool (not shown) (which is an oscilloscope or the like), and, based on the display result, adjustment is performed so that the resolving power performance may become satisfactory.

When the adjustment inside the slave carriage 38B has been completed with high resolving power performance through positional adjustment in the sub scanning direction between the imaging lens 16 and the CCD 17 of this apparatus, it is only necessary for the adjustment when connecting the slave carriage 38B to the base carriage 38A to consist in making sure that the light beam based on the image of the adjustment chart 11 passes the slit center, whereby the process is simplified and it is possible to perform mass production in a stable fashion.

Generally speaking, when continuously driven, a CCD generates heat, and, in the case of a resin carriage, thermal deformation is involved, so that high precision position adjustment is rather difficult to perform. Further, the carriage, which retains a number of parts with high precision, exhibits a complicated structure, so that it is rather difficult and also rather expensive to prepare it by using a metal material, such as aluminum die casting.

In this embodiment, the carriage 38 can be divided into two components: the base carriage 38A and the slave carriage 38B, so that it is possible to prepare exclusively the slave carriage 38B by using a metal material, such as aluminum die casting, whereby it is possible to achieve a high precision position adjustment and a reduction in cost.

Further, when the slave 38B is configured so as to be capable of moving also in the optical axis direction with respect to the base carriage 38A, the degree of freedom is enhanced for the slave carriage position adjustment device 30, whereby it is possible to provide not only an adjustment mechanism for the resolving power in the sub scanning direction but also an adjustment mechanism for magnification.

While in Embodiments 1, 2, and 3 described above there is adopted an imaging means with a refraction surface rotationally asymmetrical with respect to the optical axis, this should not construed restrictively; it is possible to attain the same effect as that of the above embodiments by using as the imaging means an optical element with a rotationally asymmetrical reflection surface (off-axial reflection surface).

Further, while in the above embodiments the adjusting method of the present invention is applied to the image reading apparatus of a digital copier, this should not be construed restrictively; it is also applicable to various color image reading apparatuses, such as a digital color copier and a color image scanner.

Embodiment 4

Figure 5:
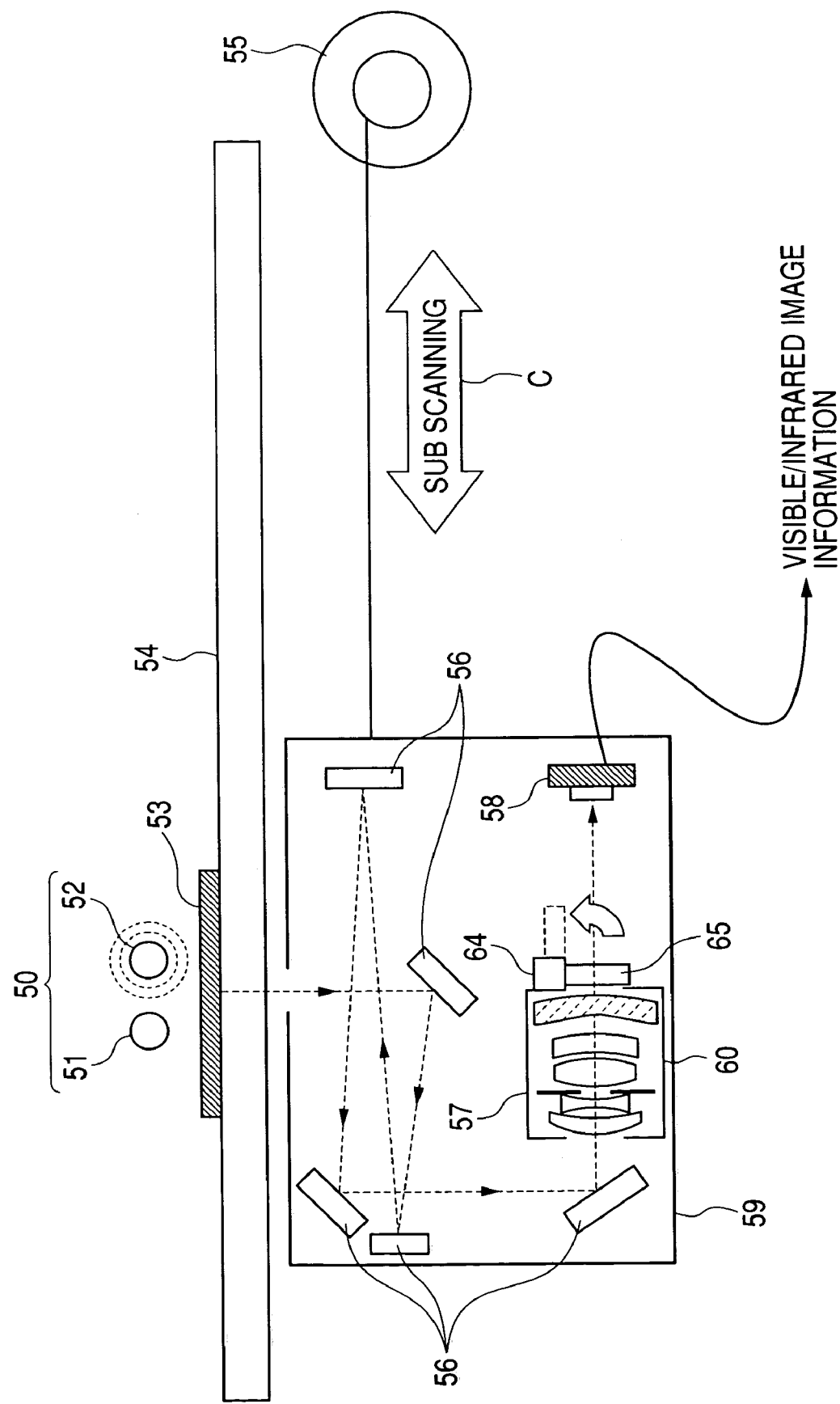
FIG. 5 is a schematic view of a main portion of Embodiment 4 of the present invention.
Figure 6:
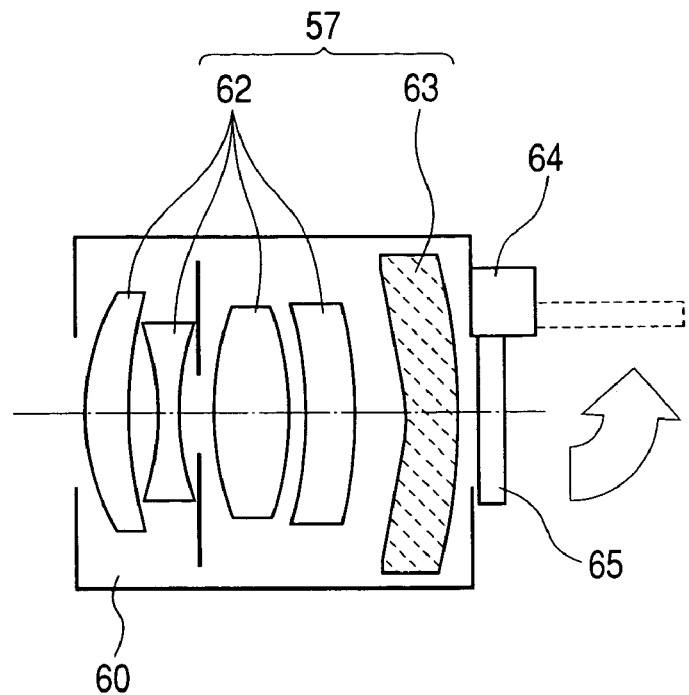
FIG. 6 is a schematic view of a main portion of a lens barrel shown in FIG. 5.

FIG. 5 is a main-portion schematic view of a carriage-integrated type image reading apparatus according to Embodiment 4 of the present invention, and FIG. 6 is an enlarged explanatory view of a lens unit shown in FIG. 5.

In FIGS. 5 and 6, reference numeral 50 indicates a light source means, which has a visible light source 52 emitting visible range light (a visible image) and an infrared light source 51 emitting infrared range light (an infrared image). Reference numeral 54 indicates an original table glass, on which a transmissive original 53 is placed. Reference numeral 59 indicates a carriage, which integrally accommodates a plurality of reflecting mirrors 56, an imaging means (imaging lens) 57, a reading means (CCD) 58, etc., and is adapted to perform scanning in the sub scanning direction (the direction indicated by the arrow C in FIG. 5) by a driving device 55, such as a sub scanning motor, to two-dimensionally read the image information of the transmissive original 53.

The imaging means 57 is provided inside a lens barrel 60, and has a plurality of glass lenses 62 and a resin lens 63, effecting imaging on the surface of the CCD 58 with the image information of the transmissive original 53. The resin lens 63 is provided so as to be the nearest to the CCD 58 and in close proximity to a focusing correction element 65 serving as the focusing correcting means. Each of the elements: the imaging lens 57 and the lens barrel 60, constitutes an element of a lens unit.

The focusing correction element 65 consists, for example, of a flat glass plate, and is provided in the optical path between the imaging lens 57 and the CCD 58 and movably mounted to the lens barrel 60 (so as to be put in and retracted from the optical path), performing correction on defocusing of the transmissive original 53 on the surface of the CCD 58 generated due to the difference in wavelength between the emission light beams from the visible light source 52 and the infrared light source 51. This focusing correction element 65 is put in the optical path when imaging of a visible image is to be formed on the surface of the CCD 58 and retracted from the optical path when imaging of an infrared image is to be formed on the surface of the CCD 58.

Reference numeral 64 indicates an electromagnet, which is mounted to the lens barrel 60, enabling the focusing correction element 65 to be put in and retracted from the optical path.

As described above, in the image reading apparatus of this embodiment, information on dirt and flaws on the surface of the transmissive original 53 is obtained by using infrared light, and the corresponding portion is corrected in visible image information. Here, the imaging position varies due to the difference in wavelength between the infrared light beam emitted from the infrared light source 51 and the visible light beam emitted from the visible light source 52, so that the focusing position is adjusted by enabling the focusing correction element 65 to be put in and retracted from the optical path.

In this embodiment, apart from the occasion when imaging of an infrared image is to be formed on the surface of the CCD 58, the focusing correction element 65 is put in the optical path when imaging of an visible image is to be formed, when assembly and adjustment are to be conducted, and, further, when transportation is to be effected from the lens plant to the image reading apparatus plant, thus protecting the resin lens 64.

In this embodiment, when the imaging lens 57 is used in a flat bed type image reading apparatus (image scanner) shown in FIG. 5, etc., it is used as a reducing glass for imaging the image information of an original of A4 or A3 width on the surface of the CCD 58 with a width ranging from 40 to 100 (mm). Thus, due to the imaging magnification, the color drift amount of the visible image and the infrared image in the optical path from the imaging lens 57 to the CCD 58 is smaller as compared with the color drift amount of the visible image and the infrared image in the optical path from the original 53 to the imaging lens 57. Thus, the requisite correction amount is smaller when the focusing correction element 65 is put in the optical path between the imaging lens 57 and the CCD 58, thus making it possible to achieve a reduction in thickness.

Further, the focusing correction element 65 of this embodiment can be brought close to the imaging lens 57, so that it is possible to achieve a reduction in length, in particular, in the main scanning direction, thereby making it possible to achieve a reduction in size. When it is used as a reducing glass in a flat bed type image scanner or the like, it is possible to reduce the thickness of the flat glass plate of the focusing correction element 65. Further, since the resin lens 63 is protected by the focusing correction element 65, it is possible to mitigate deterioration in image quality or production yield due to dirt or the like on the lens surface.

Further, in the image reading apparatus of this embodiment, the imaging lens 57 is equipped with the focusing correction element 65, so that the assembly process is not so complicated as in the prior art, and the assembly time is shortened, thereby making it possible to achieve a reduction in cost. Further, transportation from the lens plant to the assembly plant is effected, with the resin lens 63 being protected by the focusing correction element 65, allowing the completion of the assembly and adjustment processes, so that the resin lens 63 is perfectly free from dirt or flaws, thereby achieving an improvement in terms of image quality and yield.

Embodiment 5

Figure 7:
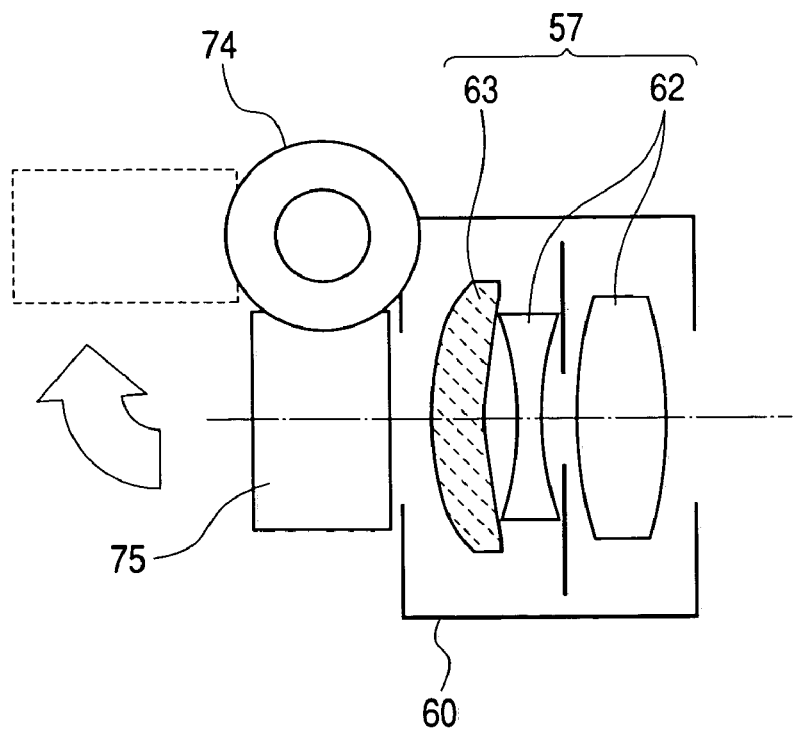
FIG. 7 is a schematic view of a main portion of Embodiment 5 of the present invention.
Figure 8:
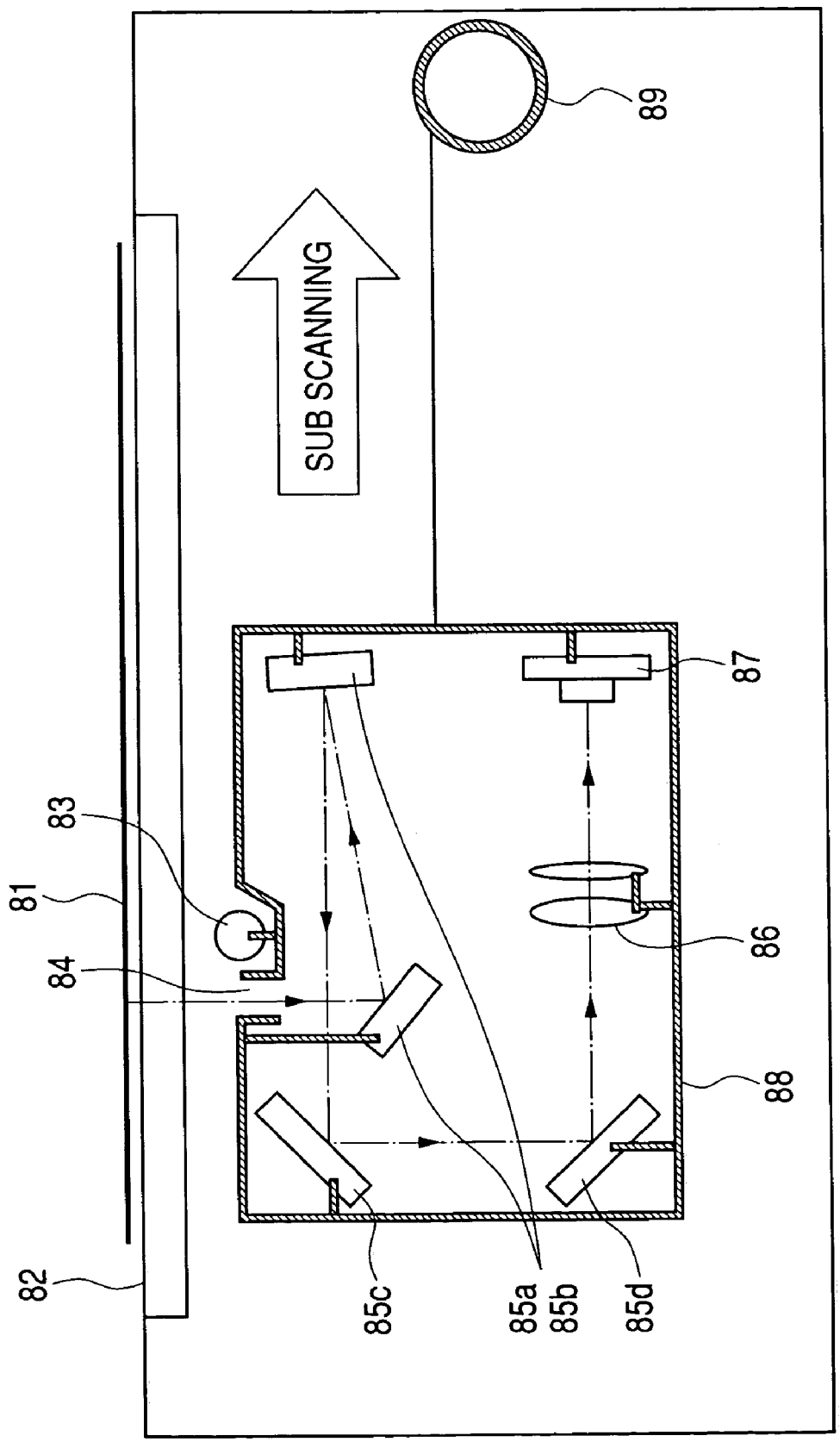
FIG. 8 is a schematic view of a main portion of a conventional image reading apparatus.

FIG. 7 is an enlarged explanatory view of a lens unit according to Embodiment 5 of the present invention. In the drawing, the components that are the same as those of FIG. 6 are indicated by the same reference numerals.

This embodiment differs from Embodiment 4 described above in that a focusing correction element 75 is provided in the optical path between the transmissive original 53 and the imaging lens 57 and movably mounted to the lens barrel 60 (so as to be capable of being put in and retracted from the optical path), and that the resin lens 63 is disposed so as to be the nearest to the transmissive original 53 side. Otherwise, this embodiment is substantially the same as Embodiment 4 in terms of construction and optical operation, and provides the same effect.

In the drawing, reference numeral 75 indicates the focusing correction element serving as the focusing correcting means, which consists of a transmissive flat resin plate and is movably mounted to the lens barrel 60. As the material of the transmissive flat resin plate, a hard one such as an acrylic resin is preferable since it is relatively free from flaws and easy to clean.

Reference numeral 74 indicates a motor, which is mounted to the lens barrel 60 and enables the focusing correction element 75 to be put in and retracted from the optical path.

As in Embodiment 1 described above, apart from the occasion when imaging of an infrared image is to be formed on the surface of the CCD 58 inside the image reading apparatus, the focusing correction element 75 is put in the optical path when imaging of an visible image is to be formed, when assembly and adjustment are to be conducted, and, further, when transportation is to be effected from the lens plant to the image reading apparatus plant, thus protecting the resin lens 63.

In this embodiment, when the imaging lens is used in an image reading apparatus dedicated to film scanning (image scanner), etc., it is used as a 1× or a substantially magnifying lens to form the image information of an original with a width of 35 (mm) on the surface of a CCD with a width ranging from 20 to 50 (mm). Thus, due to the imaging magnification, the color drift amount of the visible image and the infrared image in the optical path from the original to the imaging lens is smaller as compared with the color drift amount of the visible image and the infrared image in the optical path from the imaging lens to the CCD. Thus, the requisite correction amount is smaller when the focusing correction element 75 is put in the optical path between the transmissive original 53 and the imaging lens 57, thus making it possible to achieve a reduction in thickness.

Further, as in Embodiment 1 described above, the focusing correction element 75 of this embodiment can be brought close to the imaging lens 57, so that it is possible to achieve a reduction in length, in particular, in the main scanning direction, thereby making it possible to achieve a reduction in size. When it is used as a 1× or a substantially magnifying lens in an image scanner or the like dedicated to film scanning, it is possible to reduce the thickness of the transmissive flat resin plate of the focusing correction element 75. Further, since the resin lens 63 is protected by the focusing correction element 75, it is possible to mitigate deterioration in image quality or production yield due to dirt or the like on the lens surface.

While Embodiments 4 and 5 described above are applied to a carriage-integrated type image reading apparatus, this should not be construed restrictively; the present invention is also applicable, for example, to an image reading apparatus with a 1:2 scanning optical system in which the image information of a transmissive original illuminated by a light source means having a visible light source and an infrared light source is conveyed through a slit member and travels by way of first, second, and third reflecting mirrors to effect imaging on the surface of a reading means (CCD) by means of an imaging lens accommodated in a lens barrel.

This application claims priority from Japanese Patent Application No. 2003-330029 filed Sep. 22, 2003, which is hereby incorporated by reference herein.

What is claimed is:

1. An image reading apparatus comprising:
   an illuminating means having a visible light source means for effecting light emission in a visible range and an infrared light source means for effecting light emission in an infrared range;
   an imaging means for forming an image on a surface of a reading means by using an original illuminated by light emitted from the illuminating means; and
   a focusing correcting means for correcting defocusing of the original on the surface of the reading means due to a difference in wavelength between emission lights from the visible light source means and the infrared light source means,
   wherein the imaging means is accommodated in a lens barrel and includes a resin lens disposed on a side of the imaging means nearest to the reading means; and
   wherein the focusing correcting means is movably mounted to the lens barrel and is mounted in close proximity to the resin lens.

2. An image reading apparatus according to claim 1, wherein the focusing correcting means comprises a flat glass plate.

3. An image reading apparatus according to claim 1, wherein the focusing correcting means comprises a flat transmissive resin plate.

4. An image reading apparatus according to claim 3, wherein the focusing correcting means is retracted from an optical path when forming an image on the reading means by using image information in the infrared range.

5. An image reading apparatus according to claim 1, wherein the resin lens is arranged adjacent the focusing correcting means.

* * * * *